United States Patent Office 3,032,473
Patented May 1, 1962

3,032,473
PREPARATION OF 6-AMINOPENICILLANIC ACID BY ENZYMATIC HYDROLYSIS
Harvey E. Alburn, West Chester, Norman H. Grant, Wynnewood, and Donald E. Clark, Philadelphia, Pa., assignors to American Home Products Corporation, New York, N.Y., a corporation of Delaware
No Drawing. Filed Mar. 14, 1961, Ser. No. 95,517
3 Claims. (Cl. 195—36)

This invention is concerned with the new and improved method for preparing 6-aminopenicillanic acid from penicillins. More particularly, our invention relates to a method for preparing 6-aminopenicillanic acid wherein a hydrolytic enzyme is used to catalyze cleavage of the amide linkage at $C_6$ of a compound such as phenoxymethyl penicillin (Penicillin V), thereby resulting in 6-aminopenicillanic acid and phenoxyacetic acid.

The compound 6-aminopenicillanic acid is a highly useful precursor in the synthesis of various penicillins.

Our process of preparing this compound, wherein a hydrolytic enzyme is used to catalyze cleavage of a penicillin, such as phenoxymethyl penicillin, is characterized by certain very definite advantages. One advantage is that there are very few components present in the reaction mixture, thus facilitating subsequent isolation of the desired 6-aminopenicillanic acid. Another advantage, of considerable importance in commercial operations, is that it is possible to vary the concentration of the penicillin treated within very wide limits, thus effectively varying, indirectly, the concentration of 6-aminopenicillanic acid in the reaction mixture from which it is to be recovered.

As the hydrolytic enzyme utilized in our process to catalyze cleavage of the amide linkage at $C_6$ of such a penicillin as Penicillin V, we prefer to use ficin. This proteolytic enzyme occurs in the latex of tropical trees of the genus Ficus, especially those of the subgenus Pharmacosyce, Moraceae. The commercial product is a concentrate and it is possible to secure it in crude or partially purified form. Any of the available ficin commercial products are satisfactory for us in our process.

In carrying out our improved process for the preparation of 6-aminopenicillanic acid the penicillin, ordinarily phenoxymethyl penicillin (Penicillin V) and ficin are brought together in an aqueous solution which, preferably, also contains a phosphate buffer capable of buffering the pH of the reaction mixture to one approximating neutrality. It is also desirable that the reaction mixture be preferably agitated at room temperature or, alternatively, it may be incubated at a temperature somewhat above room temperature, such as one in the neighborhood of 38° C., for 18 to 24 hours. The desired compound may be recovered in any suitable manner, such as by adsorption on any suitable resin, followed by elution therefrom. Modified forms of Penicillin V, such as benzathine Penicillin V, may also be utilized as a substrate in our improved method.

The hydrolytic cleavage which occurs, effected by the action of a hydrolytic enzyme such as ficin, may be represented diagrammatically as follows:

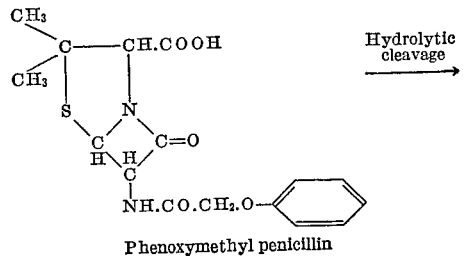

Phenoxymethyl penicillin

Hydrolytic cleavage
→

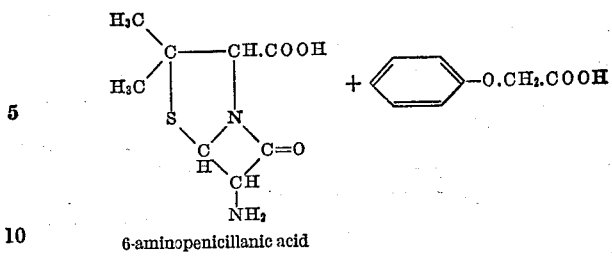

6-aminopenicillanic acid

The following examples are illustrative of our improved process.

Example 1

The reaction mixture consisted of 6.8 grams of Penicillin V (phenoxymethylpenicillin), 8.0 grams of freeze-dried, dialyzed crude ficin, 6.0 grams of neutralized reduced glutathione, 684 milliliters of 0.3 M sodium acetate-acetic acid (pH 7.0) and 1030 milliliters of water. The reaction mixture was incubated for 18 hours at 38° C. At the end of this time biological assays showed the presence of 2800 units of penicillin per milliliter before acylation, and of 4400 units of penicillin per milliliter after acylation (i.e., addition of phenoxyacetyl chloride).

The reaction mixture was then passed through a column of the resin Dowex 1–X10 in the acetate form, the column being 4.4 centimeters in diameter and having a length of 45.7 centimeters. The column was then washed with 500 milliliters of water and the 6-aminopenicillanic acid then eluted with 0.1 M aqueous acetic acid solution. Hydroxamate-positive material, which began to be desorbed at a pH of about 3.8, was collected and freeze-dried. There was thus obtained 0.5 gram of 58 percent pure 6-aminopenicillanic acid.

In a second reaction system similar to the first, as above described, except that 10 grams of ficin was used as the hydrolytic enzyme, the chromatography was carried out at the termination of the incubation period on a column of the resin Dowex 1–X10 in the sulfate form, which column was 3.5 centimeters in diameter and 38.8 centimeters in length. There was thus secured 0.6 gram of 6-aminopenicillanic acid of 33 percent purity.

A pool of partially purified 6-aminopenicillanic acid, 1 gram in amount, and having a weighted purity of 43 percent, was extracted with 5 milliliters of water at 1° C. The residue was resuspended in 5 milliliters of water and neutralized in the cold with partial solubilization to pH 7.0 by the addition of aqueous sodium hydroxide solution of 1 N concentration. The product, 6-aminopenicillanic acid, crystallized out when the pH was adjusted to 4.28 by the addition of 4 M aqueous hydrochloric solution.

The precipitate was collected and washed with water and acetone, and then dried in a vacuum desiccator. The initial water extract contained 680 milligrams of 6-aminopenicillanic acid of 27 percent purity, indicating the presence of a contaminant capable of enhancing the water solubility of 6-aminopenicillanic acid. The washed crystals from the isoelectric precipitation were white in color, melted at 197–198° C., and weighed 72 milligrams. The melting point 197–198° C., was identical with that of a known, fermentation-produced sample of 6-aminopenicillanic acid.

Analysis confirmed the empiric formula $C_{18}H_{12}O_3N_2S$ for 6-aminopenicillanic acid.

Required: C, 44.4%; H, 5.6%; N, 13.0%. Found: C, 44.0% H, 5.6%; N, 13.9%.

The infra-red spectographic pattern of the product was identical with that of a known 6-aminopenicillanic acid sample, thus further establishing the identity of the product.

Example 2

The reaction system in this conversion consisted of 2.4 grams of Penicillin V (phenoxymethylpenicillin), 3.7 grams of glutathione, 3.6 grams of freeze-dried, dialyzed ficin, 240 milliliters of 0.3 M aqueous potassium phosphate (pH 7.0), and 360 milliliters of water. The mixture was shaken for 18 hours at 38° C. in a shake flask.

The mixture was then chromatographed on a column of Dowex 1–X10 in the chloride form, the column being 3.5 centimeters in diameter and having a length of 34.0 centimeters. The non-retarded material, with a peak at about 400 milliliters of effluent at a pH of about 6, gave a strong ninhydrin reaction but no hydroxamate reaction. It displayed no antibiotic activity against Staph. aureus with or without acylation by adding phenoxyacetylchloride. Ninhydrin reactivity had almost returned to zero after 700 milliliters had been collected, and at this point elution with 0.05 N hydrochloric acid was begun. Elution peaks at 1500 milliliters and 1700 milliliters, separated by a dip but not a return to the base line, were detected with both the hydroxamate and ninhydrin assays. These peaks were combined for antibiotic assay. Without acylation, 1 to 10 dilution showed no activity. With acylation, by the addition of phenoxyacetylchloride, 1 to 800 dilutions showed one unit of Penicillin V per milliliter. This demonstrated the elution of 6-aminopenicillanic acid from the column.

Example 3

In this operation benzathine Penicillin V was used as the substrate.

The reaction system consisted of 8 milligrams of benzathine Penicillin V, 33 milligrams of reduced sodium glutathione, 15 milligrams of freeze-dried, dialyzed ficin, 1.0 milliliter of 0.3 M potassium phosphate buffer (pH 7.0) and 4.0 milliliters of water.

After incubation, with shaking, for 18 hours at 38° C. the system was filtered and the filtrate then assayed for antibiotic activity. Before acylation, the solution had a penicillin activity of 630 units per milliliter. After acylation by the addition of phenoxyacetyl chloride the penicillin activity was 900 units per milliliter. This established the formation of the desired compound, 6-aminopenicillanic acid, which, however, was not recovered from the reaction mixture.

We claim:

1. The process of converting penicillin to 6-aminopenicillanic acid which comprises incubating a reaction mixture including penicillin and ficin for a period sufficient to bring about hydrolysis of the amide group of the penicillin at $C_6$, thus forming 6-aminopenicillanic acid.

2. The process defined in claim 1 wherein the penicillin utilized is Penicillin V.

3. The process defined in claim 1 wherein the penicillin utilized is benzathine Penicillin V.

References Cited in the file of this patent

J. Agr. Chem. Soc. Japan, 23, p. 411 (1950).